(12) United States Patent
Takiue et al.

(10) Patent No.: US 8,802,233 B2
(45) Date of Patent: Aug. 12, 2014

(54) META-TYPE WHOLLY AROMATIC POLYAMIDE FIBER EXCELLENT IN HIGH-TEMPERATURE PROCESSABILITY, AND METHOD FOR PRODUCING THE SAME

(75) Inventors: Kotaro Takiue, Iwakuni (JP); Hiroshi Fujita, Mihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 12/162,762

(22) PCT Filed: Jan. 30, 2007

(86) PCT No.: PCT/JP2007/051880
§ 371 (c)(1),
(2), (4) Date: Jul. 30, 2008

(87) PCT Pub. No.: WO2007/089008
PCT Pub. Date: Aug. 9, 2007

(65) Prior Publication Data
US 2009/0054620 A1 Feb. 26, 2009

(30) Foreign Application Priority Data

Jan. 31, 2006 (JP) ................................ 2006-022364
Feb. 15, 2006 (JP) ................................ 2006-037905

(51) Int. Cl.
| | | |
|---|---|---|
| B32B 27/34 | (2006.01) | |
| D01F 6/60 | (2006.01) | |
| D01F 6/80 | (2006.01) | |
| D01F 6/90 | (2006.01) | |
| C08G 69/32 | (2006.01) | |
| D06M 101/36 | (2006.01) | |
| D04H 1/42 | (2012.01) | |
| D04H 1/4342 | (2012.01) | |
| D04H 1/55 | (2012.01) | |
| D04H 3/16 | (2006.01) | |
| D06P 1/673 | (2006.01) | |
| D06P 3/24 | (2006.01) | |

(52) U.S. Cl.
CPC .............. D01F 6/605 (2013.01); *D01F 6/805* (2013.01); *D01F 6/905* (2013.01); *C08G 69/32* (2013.01); *D06M 2101/36* (2013.01); *D04H 1/42* (2013.01); *D04H 1/4342* (2013.01); *D04H 1/55* (2013.01); *D04H 3/16* (2013.01); *D06P 1/67341* (2013.01); *D06P 3/24* (2013.01)
USPC ...... 428/395; 264/172.16; 264/184; 264/433; 264/623; 428/364; 528/310

(58) Field of Classification Search
CPC ......... D01F 6/605; D01F 6/805; D01F 6/905; C08G 69/32; D06M 2101/36; D04H 1/42; D04H 1/4342; D04H 1/541; D04H 1/55; D04H 3/16; D06P 1/67341; D06P 3/24
USPC .............. 528/310; 264/172.16, 184, 433, 623
See application file for complete search history.

(56) References Cited

U.S. PATENT DOCUMENTS

| | | | | |
|---|---|---|---|---|
| 3,360,595 | A | | 12/1967 | Wittels |
| 4,751,760 | A | * | 6/1988 | Norota .......................... 15/207.2 |
| 5,688,596 | A | * | 11/1997 | Makino et al. ................ 428/379 |
| 6,258,916 | B1 | * | 7/2001 | Michaud et al. ................ 528/48 |
| 6,569,987 | B1 | * | 5/2003 | Ohba et al. .................... 528/310 |

FOREIGN PATENT DOCUMENTS

| | | |
|---|---|---|
| CN | 1710160 A | 12/2005 |
| EP | 1 172 466 A1 | 1/2002 |
| GB | 1288652 A | 9/1972 |
| JP | 3514399 | 2/1957 |
| JP | 47010863 | 5/1972 |
| JP | 48017551 | 3/1973 |
| JP | 50052167 | 5/1975 |
| JP | 52043930 B | 4/1977 |
| JP | 56031009 A | 3/1981 |
| JP | 61-245305 A | 10/1986 |
| JP | 08074121 A | 3/1996 |
| JP | 10088421 A | 4/1998 |
| JP | 2001303365 A | 10/2001 |
| JP | 2001348726 A | 12/2001 |

(Continued)

OTHER PUBLICATIONS

European Office Action in corresponding Application No. 07 708 008.3-1217 issued on Dec. 4, 2012.
Anonymous for Dupont: "Technical Guide for NOMEX Brand Fiber, Manual", Jul. 1, 2001, pp. 1-40, XP008154632, Retrieved from the Internet: URL:http://web.archive.org/web/20100601071924/http://www2.dupont.com/Personal_Protection/en_US/assets/downloads/nomex/Nomex_Techinal_Guide.pdf.

(Continued)

*Primary Examiner* — Gregory Listvoyb
(74) *Attorney, Agent, or Firm* — Sughrue Mion, PLLC

(57) ABSTRACT

Upon producing a meta-type wholly aromatic polyamide fiber by wet spinning a polymer solution containing a meta-type wholly aromatic polyamide containing a m-phenylene-diamine isophthalamide skeleton as a major component, and an amide solvent containing a salt, (1) the polymer solution is ejected into a coagulation bath containing an amide solvent and water and containing a salt at a low concentration to coagulate as a porous thread body (fibrous material), (2) which is subsequently stretched in a plastic stretching bath containing an aqueous solution of an amide solvent, (3) is rinsed with water and then subjected to a heat treatment in a saturated steam atmosphere, and (4) is then subjected to a dry heat treatment, so as to produce a novel meta-type wholly aromatic polyamide fiber that contains an extremely small amount of a solvent remaining in the fibers, contains a small amount of a volatile substance harmful in a heat treatment step at a high temperature, is capable of suppressing coloration of a fiber product, and is capable of providing a product with high performance and high quality.

21 Claims, No Drawings

(56) References Cited

FOREIGN PATENT DOCUMENTS

| | | | |
|---|---|---|---|
| JP | 2003301326 A | 10/2003 | |
| JP | 2003342832 A | 12/2003 | |
| JP | 2004003049 A | 1/2004 | |
| JP | 2004-277937 A | 10/2004 | |
| JP | 2005-042262 A | 2/2005 | |
| JP | 2005054315 A | 3/2005 | |
| JP | 2005054335 A | 3/2005 | |
| JP | 2005232598 A | 9/2005 | |
| SU | 1688612 A1 | 12/1993 | |
| WO | 01/29296 A1 | 4/2001 | |

OTHER PUBLICATIONS

Indian Office Action for Application No. 6490/DELNP/2008 dated Dec. 31, 2013, 3 pages.

* cited by examiner

META-TYPE WHOLLY AROMATIC POLYAMIDE FIBER EXCELLENT IN HIGH-TEMPERATURE PROCESSABILITY, AND METHOD FOR PRODUCING THE SAME

TECHNICAL FIELD

The present invention relates to a meta-type wholly aromatic polyamide fiber excellent in high temperature processability, and a method for producing the same. More specifically, it relates to a novel meta-type wholly aromatic polyamide fiber that contains an extremely small amount of a solvent remaining in the fibers, contains a small amount of a volatile substance harmful in a heat treatment step at a high temperature, is capable of suppressing coloration of a fiber product, and is capable of providing a product with high performance and high quality, produced by subjecting a fibrous material, which is formed by a wet spinning method from a meta-type wholly aromatic polyamide polymer solution containing a salt, to a saturated steam treatment and then to a heat treatment to form, and a method for producing the same.

BACKGROUND ART

It has been well known that a wholly aromatic polyamide produced from an aromatic diamine and an aromatic dicarboxylic dichloride is excellent in heat resistance and excellent in flame retardancy. It has also been known that the wholly aromatic polyamide is soluble in an amide solvent, and a fiber can be obtained from the polymer solution through such a method as dry spinning, wet spinning, semi-dry and semi-wet spinning and the like.

In the wholly aromatic polyamide, a fiber of a meta-type wholly aromatic polyamide (which is hereinafter abbreviated as "metalamide" in some cases) represented by poly-m-phenylene isophthalamide is particularly useful as a heat resistant and flame retardant fiber, and as a method for producing the metalamide fiber, the following two methods (a) and (b) have been employed. Furthermore, the following method (c) to (e) have been also proposed as a method for producing the metalamide fiber.

(a) A method, in which m-phenylenediamine and isophthalic chloride are subjected to low temperature solution polymerization in N,N-dimethylacetamide to prepare a poly-m-phenylene isophthalamide solution, and then a polymer solution containing calcium chloride obtained by neutralizing hydrochloric acid by-produced in the solution with calcium hydroxide is dry-span to produce a metalamide fiber (see JP-B-35-14399 and U.S. Pat. No. 3,360,595).

(b) A method, in which an organic solvent (such as tetrahydrofuran) that is not a good solvent of a product polyamide containing a m-phenylenediamine salt and isophthalic chloride is made in contact with an aqueous solution system containing an inorganic acid receiving agent and a soluble neutral salt to isolate powder of a poly-m-phenylene isophthalamide (see JP-B-47-10863), and the polymer powder is re-dissolved in an amide solvent and then wet-spun in an aqueous coagulation bath containing an inorganic salt to produce a fiber (see JP-B-48-17551).

(c) A method, in which a molded article, such as a fiber, is produced by a wet-molding method from a metalamide solution containing no inorganic salt or a small amount (2 to 3%) of lithium chloride formed by dissolving a metalamide synthesized by a solution polymerization method in an amide solvent (see JP-A-50-52167).

(d) A method, in which a metalamide polymer solution, which is formed by solution polymerization in an amide solvent and contains calcium chloride formed by neutralizing with calcium hydroxide, calcium oxide or the like, and water, is passed through a gas by extruding into the gas through a spinning die, and then introduced into an aqueous coagulating bath, and is further passed through an aqueous solution of an inorganic salt, such as calcium chloride and the like, to form into a fiber material (see JP-A-56-31009).

(e) A method, in which a metalamide polymer solution, which is formed by solution polymerization in an amide solvent and contains calcium chloride formed by neutralizing with calcium hydroxide, calcium oxide or the like, and water, is spun into an aqueous coagulation bath containing calcium chloride in a high concentration through a spinning die to form into a fiber material (see JP-A-8-074121 and JP-A-10-88421).

(f) A method, in which a polymer solution of an amide solvent is ejected into a spinning column at a high temperature through a spinning die, and cooled with an aqueous solution at a low temperature at the time of being ejected from the spinning column, and is then stretched in a plastic stretching bath to form into a fiber having a considerably fine porous nature and a density of 1.3 g/cm$^3$ or less (see JP-A-52-43930).

(g) A method, in which a meta-type aramid polymer solution containing substantially no salt is coagulated by ejecting into a coagulation bath containing an amide solvent and water to form a fibrous material (filament), which is subsequently stretched in a plastic stretching bath containing an amide solvent and water and then subjected to rinsing with water and a heat treatment (see JP-A-2001-303365, JP-A-2003-301326, JP-A-2003-342832, JP-A-2004-3049, JP-A-2005-54315 and JP-A-2005-54335).

(h) A method, in which a meta-type aramid polymer solution is coagulated by ejecting into a coagulation bath containing an amide solvent and water to form a fibrous material (filament), which is subsequently stretched in the air under heat in a state where the fibrous material contains the amide solvent, and then subjected to heating and a heat treatment (JP-A-2001-348726).

(i) A method, in which a polymer solution containing a meta-type aramid and an amide solvent containing a salt is ejected into a coagulation bath containing an amide solvent and water and containing substantially no salt to form a porous filament, which is subsequently stretched in a plastic stretching bath containing an aqueous solution of an amide solvent and subjected to rinsing with water and then a heat treatment (JP-A-2005-232598).

In the method (a), in the fibrous polymer solution spun from the spinning die, the solvent is vaporized and dried from the vicinity of the surface of the fibrous material to be formed owing to dry spinning, and thus a dense and firm skin layer is formed on the surface of the fiber. Accordingly, it is difficult to remove sufficiently the solvent remaining in the fibrous material after spinning even by rinsing the solvent with water or the like. Consequently, the solvent remaining in the fiber brings about such a problem that the fiber suffers, upon using in a high temperature atmosphere, yellowing and generation of an organic gas due to evaporation or decomposition of the solvent remaining.

In the methods (b) to (e), evaporation of the solvent does not occur in the spinning step owing to wet spinning, but upon introducing into the aqueous coagulation bath or the aqueous coagulation bath containing an inorganic salt in a high concentration, the solvent is released from the vicinity of the surface of the polymer solution formed into a fiber form into the aqueous coagulation bath, and simultaneously water invades into the interior of the coagulated fibrous material from the vicinity of the surface thereof, so as to form a firm skin layer. Accordingly, the problem of yellowing and organic gas due to the solvent remaining in the fiber cannot be avoided as similar to the fiber formed by the dry spinning method.

The method (f) is for producing a porous meta-type aramid fiber having a density of 1.3 g/cm$^3$ or less, but is an application technique of the dry spinning method, and thus has the similar problem as in the dry spinning method having been described.

In the method (g), it is important to use a salt-free meta-type aramid polymer solution containing substantially no salt, and there is such a problem that for producing the salt-free polymer solution, such a step is required in that the polymer is isolated to rinse and remove a salt, or a salt in the polymer solution is filtered with a filter or the like.

In the method (h), the stretching is carried out in the air, and thus it is difficult that the temperatures of the filament and the amounts of the solvent and the like remaining each are identical between the outer periphery and the core part of the filament, whereby it is difficult to obtain a homogeneous meta-type aramid fiber.

In the method (i), the molecular orientation of the fiber is increased by stretching in the plastic stretching bath after coagulation, but the orientation is liable to be relaxed in the water rinsing and/or warm water rinsing step. Accordingly, it is necessary to increase the orientation again in the heat treatment step for obtaining a fiber having high strength, and on the other hand, rapid crystallization occurs in the heat treatment step. Consequently, the resulting fiber has such a problem that it has a high heat contraction rate at 300° C. or more.

JP-A-2000-303365 proposes a method for producing a dense metalamide fiber containing substantially no salt (inorganic ionic substance), in which a polymer solution containing no salt formed by dissolving a metalamide having m-phenylenediamine isophthalamide obtained in the similar method as the method (b) as a major repeating unit, in an amide solvent, is ejected into a coagulation bath containing an amide solvent and water and containing no salt, to coagulate as a porous fibrous material (filament), which is subsequently stretched in a plastic stretching bath containing an aqueous solution of an amide solvent, followed by subjecting to rinsing with water and then heat treatment. JP-A-2001-348726 proposes a method, in which a porous fibrous material thus coagulated is stretched under heat in the air in a state where the pores contain the coagulation liquid or a plasticizing liquid, and heated in a state where the pores contain the coagulation liquid, followed by subjecting to heat treatment.

In the methods, however, a porous fibrous material having substantially no skin layer on the surface can be obtained in the step where the metalamide solution is formed in to the fibrous material by coagulation. However, upon removing sufficiently the solvent remaining in the fiber in the state of the porous fibrous material, it is significantly difficult to stretch thereafter, and thus it is difficult to effect sufficient orientation and crystallization. Accordingly, the fiber thus obtained by the methods has such a defect that it is inferior in fiber property that is inherent to a metalamide fiber, particularly high temperature heat contraction stability.

As having been described, it is the actual current situation that such a meta-type wholly aromatic polyamide fiber has not yet been known that is suppressed in yellowing and generation of an organic gas in a high temperature processing step, and is capable of providing a product having high performance, such as flame retardancy, breaking strength and dimensional stability in a high temperature atmosphere.

DISCLOSURE OF THE INVENTION

An object of the invention is to provide a novel meta-type wholly aromatic polyamide fiber that resolves the defects of the conventional products, is capable of suppressing coloration or discoloration of a product even under processing and using conditions at a high temperature, and is capable of suppressing generation of a harmful gas or an organic gas, in addition to the natures that are inherent to a heat resistant and flame retardant meta-type wholly aromatic polyamide fiber, and a method for producing the same.

The object of the invention can be attained by a meta-type wholly aromatic polyamide fiber excellent in high temperature processability, characterized in that an amount of a solvent remaining in the fiber is 1.0% by weight or less, a dry heat contraction rate at 300° C. is 3% or less, and a breaking strength of the fiber is 3.0 cN/dtex or more, and a method for producing a meta-type wholly aromatic polyamide fiber by wet spinning a polymer solution containing a meta-type wholly aromatic polyamide containing a m-phenylenediamine isophthalamide skeleton as a major component, and an amide solvent containing a salt, characterized in that (1) the polymer solution is ejected into a coagulation bath containing an amide solvent and water and containing a salt to coagulate as a porous fibrous material, (2) which is subsequently stretched in a plastic stretching bath containing an aqueous solution of an amide solvent, (3) is rinsed with water and then subjected to a heat treatment in saturated steam, and (4) is then subjected to a dry heat treatment.

In the method of the invention, the steps (1) to (4) are sequentially carried out for producing a fiber from a meta-type wholly aromatic polyamide polymer solution, and it is preferred that in the step (1), the coagulation bath has a composition in terms of weight ratio of the amide solvent of from 40 to 60% by weight and a concentration of the salt of from 0.3 to 10% by weight, and a temperature of the coagulation bath is from 20 to 70° C.; in the step (2), the plastic stretching bath has a composition in terms of weight ratio of the amide solvent of from 20 to 70% by weight, and the fibrous material is stretched at a ratio of from 1.5 to 10 times in the plastic stretching bath at a temperature of from 20 to 70° C.; in the step (3), the fibrous material is subjected to the heat treatment at a stretching ratio of from 0.7 to 5.0 times in saturated steam of from 0.02 to 0.50 MPa; and in the step (4), the fibrous material is subjected to the dry heat treatment at a stretching ratio of from 0.7 to 4.0 times under a condition of from 250 to 400° C.

In the method of the invention, as the amide solvent contained in the polymer solution, the coagulation bath and the plastic stretching bath, it is recommended to use a sole solvent containing one selected from the group consisting of N-methyl-2-pyrrolidone, dimethyacetamide and dimethylformamide, or a mixed solvent containing two or more selected from the group. The kinds of the amide solvents used may be different from each other in every step, but it is preferred to use a solvent of the same kind throughout all the steps from the standpoint of recovery of the solvent.

BEST MODE FOR CARRYING OUT THE INVENTION

Embodiments of the invention will be described in detail below.

To the polymer constituting the meta-type wholly aromatic polyamide fiber according to the invention, those obtained through polycondensation of an aromatic dicarboxylic acid, an aromatic diamine, an aromatic aminocarboxylic acid and the like in a ratio providing substantially equimolar amounts of a carboxyl group and an amino group are applied, and specifically, a meta-type wholly aromatic polyamide containing a m-phenylenediamine isophthalamide skeleton as a major component is mainly applied. In the fiber containing the meta-type wholly aromatic polyamide, a poly-m-phenylene isophthalamide fiber is particularly preferred as the fiber applied to the invention since it is often used as a heat resistant fiber and a flame retardant fiber in a high temperature atmosphere owing to the excellent mechanical characteristics.

A meta-type wholly aromatic polyamide fiber is generally produced from a spinning solution formed by dissolving a polymer in an amide solvent, and thus the solvent necessarily remains in the fiber. However, it is necessary that the meta-type wholly aromatic polyamide fiber of the invention has an amount of a solvent remaining in the fiber is 1.0% by weight or less based on the weight of the fiber, and preferably from 0.01 to 0.8% by weight. In the case where the solvent remains in the fiber in an amount exceeding 1.0% by weight based on the weight of the fiber, it is not preferred since the fiber suffers considerable yellowing or considerable deterioration in quality upon processing or using in a high temperature atmosphere. Furthermore, it is not preferred since an organic gas is liable to be generated upon processing or using in a high temperature atmosphere or upon incineration to increase environmental load.

The fiber of the invention necessarily has a dry heat contraction rate of 3.0% or less at a high temperature of 300° C., and preferably from 0.1 to 2.0%. In the case where the dry heat contraction rate exceeds 3.0%, it is not preferred since a product suffers change in dimension upon using in a high temperature atmosphere exceeding 300° C., which brings about such a problem that the product is broken.

In the invention, the fiber necessarily has a breaking strength of 3.0 cN/dtex or more. In the case where the breaking strength is less than 3.0 cN/dtex, it is not preferred since the resulting product is low in strength to fail to withstand use for the purpose of the product. The breaking strength of the fiber is preferably from 3.5 to 7.0 cN/dtex.

The amount of a solvent remaining in the fiber, the dry heat contraction rate of the fiber at 300° C., and the breaking strength of the fiber are values that are measured in the following manners.

(A) Amount of Solvent Remaining in Fiber (Weight of Amide Compound Solvent) N (%)

About 8.0 g of the fiber collected is dried at 105° C. for 120 minutes and then allowed to cool in a desiccator, and the weight of the fiber (M1) is weighed. The fiber is subjected to reflux extraction in methanol for 1.5 hours with a Soxhlet extractor to extract the amide compound solvent contained in the fiber, and the fiber having been extracted and taken out is dried at 150° C. for 60 minutes under vacuum and then allowed to cool in a desiccator, followed by weighing the weight of the fiber (M2). The amount of the solvent remaining in the fiber (weight of the amide compound solvent) N (%) is calculated from M1 and M2 according to the following expression.

$$N (\%) = (M1 - M2)/M1 \times 100$$

(B) Dry Heat Contraction Rate at 300° C.

A load of 100 g is hanged on a tow of 3,300 dtex, and marks are put at positions apart from each other by 30 cm. After removing the load, the tow is placed in an atmosphere at 300° C. for 15 minutes, and the distance L (cm) between the marks is measured. The dry heat contraction rate at 300° C. is calculated from the value L according to the following expression.

$$\text{Dry heat contraction rate at } 300° C. = (30 - L)/30 \times 100$$

(C) Breaking Strength of Fiber

It is measured according to the method disclosed in JIS L1015.

As having been described, the meta-type wholly aromatic polyamide fiber of the invention has an amount of a solvent remaining in the fiber of 1.0% by weight or less, and preferably in a range of from 0.01 to 0.8% by weight. The dry heat contraction rate at 300° C. of the fiber is 3.0% or less, and preferably from 0.1 to 2.0%. The breaking strength of the fiber is 3.0 cN/dtex or more.

The cross sectional shape of the fiber may be a circular shape, an elliptical shape or other arbitrary shapes, and in general, the fineness of the monofilament is preferably from 0.5 to 10.0 dtex.

A meta-type wholly aromatic polyamide fiber that has these characteristics has not been known but can be produced by devising the production method and the conditions.

A solution of the meta-type wholly aromatic polyamide generally contains hydrogen chloride in a high concentration, and thus it is neutralized with an alkali, such as calcium hydroxide, sodium hydroxide, sodium carbonate or hydrogencarbonate, and the like, whereby a polymer solution having been completed in reaction and having a favorable polymerization degree and high chemical stability can be obtained as a solution of the meta-type wholly aromatic polyamide polymer.

For producing a heat resistant fiber having favorable mechanical characteristics from the meta-type wholly aromatic polyamide solution in the invention, it is important to control the polymerization degree. In particular, for obtaining a fiber having good performance from a poly-m-phenylene isophthalamide polymer, a polymer having an intrinsic viscosity (I.V.) obtained from a value measured at a polymer concentration of 0.5 g/100 mL in concentrated sulfuric acid at 30° C. of from 0.8 to 4.0, particularly from 1.0 to 3.0, and still particularly from 1.3 to 2.4, is preferred.

The demanded level of the polymerization degree of the polymer is set depending on the purpose for use of the polymer or a solution thereof and the uses of the fiber, and thus the polymerization degree is controlled by a known method in the polymerization step depending on necessity. As a means for controlling the polymerization degree, for example, the polymerization degree can be controlled by using an end terminating agent (such as aniline, an alkylaniline, such as toluidine and the like, benzoic chloride and the like).

The concentration of the polymer in the polymer solution in the invention is from 10 to 30, and preferably from 15 to 20, in terms of part by weight per 100 parts by weight in total of the polymer and the amide solvent. (The concentration is referred to as "PN concentration" in the invention. The part by weight as the unit for the PN concentration is omitted.) In the case where the PN concentration is less than 10, the polymer solution is poor in spinnability due to a too small concentration, and associated thereto, not only the performance of the fiber is deteriorated, but also it is economically unfavorable since the recycle ratio of the amide solvent is increased due to the low concentration. There is such a tendency that the transparency of the molded article (fiber) is improved with a higher PN concentration, but in the case where the PN concentration exceeds 30, it is not suitable since such a problem occurs that the polymerization reaction and the neutralization reaction cannot be carried out steadily since the polymer solution has a too high viscosity.

However, in the case where the polymerization reaction is carried out at a high concentration (for example, a PN concentration of 30 or more), calcium hydroxide or the like as a neutralizing agent in the neutralization reaction step is dispersed in a suitable amount (for example, an amount providing finally a PN concentration of less than 30) of N-methyl-2-pyrrolidone, and the resulting slurry is added, whereby the concentration of the polymer (PN concentration) can be controlled, and simultaneously the neutralization reaction can be facilitated.

The polymer solution used as a spinning solution in the invention contains the meta-type wholly aromatic polyamide and an amide solvent and also contains a salt, and the solution may further contain water. The water and salt are necessarily formed in the solution polymerization, and they may be further added depending on necessity. In the case where the polymer solution is produced by a separate solution preparing process, a salt and water may be externally added. The salt is not limited, and examples thereof include an inorganic salt, for example, a halogenide of an alkali metal, such as sodium chloride, sodium iodide, lithium chloride and the like, a halogenide, a carbonate, a hydroxide and the like of an alkaline earth metal, such as calcium chloride, calcium carbonate, calcium hydroxide, magnesium chloride and the like, and the like. While the concentration thereof may be any concentration within such a range in that the polymer solution can be present stably, it is generally contained in a range of from 2.5 to 60% by weight based on the weight of the polymer, and particularly, the concentration of the salt is preferably from 5.0 to 50% by weight. In the case where the concentration of the salt is less than 2.5% by weight, the stability of the polymer solution is lowered upon storing at a low temperature around room temperature to bring about tendency of gelation. In the case where the concentration of the salt exceeds 60% by weight, it is not preferred since the stability of the polymer solution is impaired due to the salt deposited in the solution.

The content of water in the polymer solution is suitably from 0 to 20% by weight, and more preferably from 0 to 16% by weight, based on the total weight of the solution. In the case where the content of water is too large, there are some cases where the stability of the polymer solution is deteriorated, and the spinnability is considerably deteriorated due to deposition and gelation of the polymer.

In the solution polymerization, after completing the polymerization reaction, a neutralizing agent is added to the resulting polymerization solution for neutralization. As the neutralizing agent, at least one of calcium oxide, calcium hydroxide and calcium carbonate (hydrogencarbonate) is suitably used. HCl by-produced in the polymerization reaction is neutralized through the neutralization reaction to form calcium chloride ($CaCl_2$) necessarily. The amount of HCl by-produced in the polymerization reaction varies depending on the chemical structure of the polymer and the average molecular weight of the minimum unit thereof, and in the case where HCl by-produced in the polymerization reaction, for example, of poly-m-phenylene isophthalamide is neutralized to 100% with the aforementioned compound, 46.64 parts by weight of $CaCl_2$ is formed per 100 parts by weight of the polymer. $CaCl_2$ thus formed through the neutralization reaction remains in the polymer solution and exerts function of improving the stability of the polymer solution (see JP-B-35-16027), but contrary, it has been difficult to carry out wet spinning from the polymer solution due to a large amount of $CaCl_2$ dissolved therein.

The amount of water that is formed through the neutralization reaction and is present dissolved in the solution varies depending on the kind of the neutralizing agent, and 15.13 parts by weight of water is formed per 100 parts by weight of the polymer upon neutralizing with calcium hydroxide. On the other hand, 7.56 parts by weight of water is formed per 100 parts by weight of the polymer upon neutralizing with calcium oxide or calcium carbonate. The neutralizing agent is added in the form of an aqueous solution or slurry containing water and a solvent, and water thus formed and added is also present dissolved in the polymer solution, but the stability of the solution and the characteristics of the composition after neutralization are substantially not impaired with the aforementioned amount thereof. There are cases where favorable characteristics, such as decrease in viscosity and the like, may rather occur with water contained. However, a too large amount of water is not preferred since the stability of the solution is considerably lowered (gelled). Accordingly, the suitable amount of water added in the neutralization reaction varies depending on the concentration of the polymer. The stability region of the solution is from 0 to 60.0 parts by weight of water per 100 parts by weight of the polymer. For example, the case where PN concentration=20 is substantially the same as the case where PN concentration=16, and thus the stability region is about from 15 to 60 parts by weight per 100 parts by weight of the polymer. The stability region is from 15 to 45 parts by weight of water per 100 parts by weight of the polymer for PN concentration=25, and is from 15 to 30 parts by weight of water per 100 parts by weight of the polymer for PN concentration=30.

The ranges exemplified above are approximate values upon allowing the polymer solution to stand at from 60 to 70° C., and the stability region somewhat varies depending on conditions including the polymerization degree of the polymer, the temperature for storing by allowing to stand. In any case, the allowable concentration range of water remaining dissolved in the polymer solution is limited associated with increase in polymer concentration, and upon practicing the invention, it is preferred for preventing gelation of the solution that the suitable amount is determined in advance by experiments or the like with a concentration of water of 8% by weight or less in the total polymer solution given as a standard.

According to the invention, in wet spinning, a meta-type aramid fiber that is excellent in mechanical characteristics and heat resistance can be efficiently produced with good productivity by a novel spinning process and a subsequent yarn-making process including porous coagulation and post-densification, which have been considered as being impossible in meta-type aramid.

In the conventional technique, as having been described, since it is difficult to form a fiber by wet spinning from a meta-type aramid polymer solution containing calcium chloride formed in an equimolar amount as the amide residual group upon synthesizing by solution polymerization, dry spinning and semi-dry and semi-wet spinning have been employed as a method for spinning the solution. For wet-spinning the solution, it has been necessary that in any case of solution polymerization or interface polymerization, a chloride (such as $CaCl_2$, NaCl, $NH_4Cl$ and the like) formed through neutralization of HCl by-produced is decreased by any means to 70% by weight or less, and preferably 20% by weight or less, to prepare a reduced-salt polymer solution. However, the means for removal of a chloride often involves industrial difficulties. For example, in the case where a polymer is synthesized by interface polymerization, separate recovering devices are necessarily provided for recovering a polymerization solvent and a spinning solvent, which are different from each other, and even in the case where a polymer synthesized by solution polymerization is spun with the same solvent as the polymer solution, there are necessarily difficult process steps, for example, an inorganic chloride by-produced through neutralization is removed by pressure filtration (the operation of which involves considerable industrial difficulties due to high viscosity), the inorganic chloride is removed by rinsing with water by adding water to the polymer solution, followed by drying and re-dissolution of the polymer, and the like. Accordingly, the methods are not preferred since they involve difficulties in operation, energy cost and environmental pollution.

In the method of the invention, however, even by using an equimolar $CaCl_2$-containing polymer solution, a meta-type aramid fiber excellent in gloss, mechanical characteristics, heat resistance and the like can be produced by a wet spinning method, in which the solution is directly spun through a spinning die into a coagulation bath having a particular composition containing substantially no salt, which has been considered as being difficult.

According to the invention, in wet spinning as the step (1), a coagulation bath of an aqueous solution of an amide solvent having a significantly simple composition is used, and a polymer solution is coagulated by using the same as a homogeneous porous fibrous material (filament). More specifically, the polymer solution is controlled to have a temperature corresponding to the temperature of the coagulation bath, preferably within a range of from 20 to 70° C., and then ejected through a spinning die into the coagulation bath having the composition and temperature described later to form a porous fibrous material (filament). The porous fibrous material is then taken out from the coagulation bath, and in the step (2), the porous fibrous material is subjected to plastic stretching at a stretching ratio of preferably from 2 to 10 times in an aqueous solution of an amide solvent. The porous fibrous material is then further rinsed with water and/or warm water and is once subjected to a heat treatment in a saturated steam atmosphere in the step (3), and then it is subjected to a dry heat treatment at a temperature in a range of from 250 to 400° C. in the step (4) to provide a meta-type aramid fiber as a final product. The steps (1), (2), (3) and (4) will be described in detail below.

Step (1): Wet Spinning

In the invention, for attaining densification capable of providing a fiber exhibiting sufficient properties in the subsequent step, it is particularly important to uniformize as much as possible the structure of the porous fibrous material formed in the coagulation step of the wet spinning process. There is a close relationship between the porous structure and the conditions of the coagulation bath, and the selection of the composition and the temperature condition of the coagulation bath are significantly important.

The coagulation bath used in the invention is constituted by an aqueous solution formed substantially of two components, i.e., an amide solvent and water. In the composition of the coagulation bath, an amide solvent that dissolves a meta-type wholly aromatic polyamide and is well miscible with water, and in particular, N-methyl-2-pyrrolidone, dimethylacetamide, dimethylformamide, dimethyimidazolidinone and the like are preferably used.

The optimum mixing ratio of the amide solvent and water somewhat varies depending on the conditions of the polymer solution, and in general, the ratio of the amide solvent is preferably from 40 to 60% by weight. Under the condition below the range, considerably large voids are tend to form in the coagulated fiber, which are liable to cause thread breakage in the subsequent step, and on the contrary, under the condition exceeding the range, coagulation is difficult to proceed, which brings about fusion of the fibers.

The temperature of the coagulation bath has close relationship to the composition of the coagulation solution, and in general, a high temperature is preferred since voids in the form of coarse bubbles, which are referred to as fingers, are hard to form in the fiber produced. However, in the case where the concentration of the coagulation solution is relatively large, fusion of the fibers vigorously occurs at a too high temperature, and thus the temperature range of the coagulation bath is preferably from 20 to 70° C., and more preferably from 25 to 60° C.

The coagulation solution is preferably constituted substantially only by an amide solvent and water, but since an inorganic salt, such as calcium chloride, calcium hydroxide and the like, is extracted from the polymer solution, the salt may be actually contained in the coagulation solution. The preferred concentration of the inorganic salt in industrial practice is in a range of from 0.3 to 10% by weight based on the coagulation solution. For making the concentration of the inorganic salt to less than 0.3% by weight, the recovering cost for purifying the coagulation solution in the recovering process becomes inappropriately increased. In the case where the concentration of the inorganic salt exceeds 10% by weight, on the other hand, it is not preferred since fusion of fibers immediately after ejection from the spinning die before becoming porous is liable to occur due to the low coagulation rate, and the coagulation equipment necessarily becomes large due to the prolonged coagulation time.

The immersion time of the fibrous material (filament) in the coagulation bath is preferably from 1.5 to 30 seconds. In the case where the immersion time is less than 1.5 seconds, the fibrous material is insufficiently formed to cause thread breakage. In the case where the immersion time exceeds 30 seconds, it is not preferred since the productivity is poor.

The porous fibrous material thus obtained preferably has a density as high as possible to smoothly carry out subsequent densification. The density ($g/cm^3$) in this stage is preferably 0.3 or more, and more preferably 0.5 or more. In the case where the density is less than 0.3, it is difficult to densify the fibrous material in the subsequent stretching and heat treatment step due to the high porosity. The fiber density can be calculated from the thickness and the fineness of the thread measured according to ASTM D2130.

The porous structure of the fibrous material thus coagulated is characterized by having considerably homogeneous fine pores formed therein. The pore size thereof is in a submicron order of about from 0.2 to 1 μm as measured with a scanning microscope, and there is basically no pore having a size of several micrometers, which is referred to as a void or a finger. Owing to the considerably dense and homogeneous finely porous structure, thread breakage is prevented from occurring upon stretching, and densification and exhibition of fiber properties are enabled upon final heat setting. It is known that the homogeneous and fine porous structure is formed through spinodal decomposition associated with coagulation.

Upon ejecting the polymer solution into the coagulation bath, a multi-hole spinning die may be used. The number of holes may be 50,000 or less, and preferably from 300 to 30,000. The porous fibrous material ejected from a spinning die having about 300 to 30,000 holes and coagulated in the coagulation bath is generally bundled into one fiber bundle (tow), which is then set to the subsequent steps.

Step (2): Plastic Stretching

The fiber bundle containing the porous fibrous material (filament) obtained through coagulation is introduced into a plastic stretching bath containing an aqueous solution of an amide solvent, and stretched in the bath. The plastic stretching bath in the invention contains an aqueous solution of an amide solvent and contains substantially no salt. As the amide solvent, one capable of swelling a meta-type aramid and being well miscible with water can be preferably used. Preferred examples of the amide solvent include N-methyl-2-pyrrolidone, dimethylacetamide, dimethylformamide, dimethyimidazolidinone and the like. A solvent of the same kind as used in the coagulation bath is particularly preferably used industrially. Accordingly, the amide solvents used in the polymer solution, the coagulation bath and the plastic stretching bath are preferably the same kind, and a sole solvent or a mixed solvent containing two or more selected from N-methyl-2-pyrrolidone, dimethylacetamide and dimethylformamide are preferably used. By using the amide solvents of the same kind, the recovering steps are integrated and simplified, which is economically useful.

There is a close relationship between the temperature and the composition of the plastic stretching bath, and it is preferably used when the weight concentration of the amide solvent is from 20 to 70% by weight, and the temperature is from 20 to 70° C. In the region lower than the ranges, plasticization of the fibrous material does not sufficiently proceed to fail to attain a sufficient stretching ratio upon plastic stretching, and in the region higher than the ranges, the surface of the fiber is melted and fused to fail to attain favorable spinning.

In the invention, the ratio of plastic stretching is generally from 1.5 to 10 times, and preferably from 2 to 6 times. A stretching ratio of less than 1.5 times is not preferred since the resulting fiber is poor in mechanical characteristics including strength, elastic modulus and the like. By stretching the fiber to a high ratio in the plastic stretching step, the strength and the elastic modulus of the fiber are improved to exhibit good properties, and simultaneously, the fine pores in the fiber are collapsed by stretching to facilitate favorable progress of densification by the subsequent heat treatment. Accordingly, the stretching ratio is preferably higher. However, in the case where the fiber is stretched to a high stretching ratio exceeding 10 times, it is not preferred since the condition of the process may be deteriorated to cause fuzz and thread breakage frequently.

Step (3): Rinsing and Saturated Steam Treatment

The fiber having been subjected to the step of the plastic stretching bath is then rinsed with cold water generally at 30° C. or less, and subsequently, after rinsing with warm water generally at from 50 to 90° C., subjected to a steam treatment in a saturated steam atmosphere having a saturated steam pressure of from 0.02 to 0.50 MPa. In the saturated steam treatment, the fiber can be increased in orientation while suppressing crystallization. The heat treatment in a saturated steam atmosphere can heat-treat uniformly to the interior of the fiber bundle as compared to a dry heat treatment, whereby a homogenous fiber can be obtained. Furthermore, surprisingly, the fiber surface is not crystallized to form no skin layer by the saturated steam treatment, whereby the solvent remaining in the monofilaments of the fiber bundle can be removed substantially completely from the interior of the fiber through rapid diffusion. According to the mechanism, the remaining solvent amount in the product fiber can be lowered to 1.0% by weight or less, and even when the resulting fiber is subjected to a heat treatment and working, it does not suffer fusion or coloration to suppress the quality from being deteriorated. Accordingly, the invention provides a novel meta-type wholly aromatic polyamide that is excellent in high temperature heat resistance as compared to the conventional products. However, in the case where the saturated steam pressure is less than 0.02 MPa in this step, it is not preferred since no sufficient effect of steam treatment can be obtained to provide less effect of decreasing the remaining solvent amount. In the case where the saturated steam pressure exceeds 0.5 MPa, it is not preferred since crystallization of the fiber is facilitated upon processing to form a skin layer, whereby the remaining solvent amount cannot be sufficiently decreased.

The stretching ratio in the saturated steam treatment has a close relationship to exhibition of the strength of the fiber, and in general, the stretching ratio is preferably set in a range of from 0.7 to 5 times, and more preferably in a range of from 1.1 to 2 times, while the ratio may be arbitrarily selected in consideration of the demanded properties of the product. In the case where the stretching ratio is less than 0.7 times, it is not preferred since the bundling property of the fiber bundle (filament) in the saturated steam atmosphere is deteriorated. In the case where the stretching ratio exceeds 5 times, it is not preferred since thread breakage upon stretching is increased, and fuzz and thread breakage in the process occur. The stretching ratio referred herein is expressed by the ratio of the fiber length after the treatment with respect to the fiber length before the treatment, and for example, a stretching ratio of 0.7 time means that the fiber is confinedly contracted to 70% of the original length in the saturated steam treatment step, and 1.1 times means that the fiber is treated by stretching by 10%.

The period of time of the saturated steam treatment is generally preferable from 0.5 to 5.0 seconds. In the case where the running fiber bundle is continuously treated, the treating time is determined by the running length and the running speed of the fiber bundle in the steam treatment bath, and thus they may be controlled to select the treating time capable of providing the best effect.

Step (4): Dry Heat Treatment

The fiber bundle having been subjected to the saturated steam treatment is then subjected to a dry heat treatment, such as dry heat stretching or the like, by using a heat plate, a heat roller or the like, at a temperature of from 250 to 400° C., and more preferably from 300 to 380° C. In the case where the dry heat treatment temperature is less than 250° C., it is not suitable since the porous fiber cannot be sufficiently densified, and the resulting fiber has insufficient mechanical characteristics. In the case where the dry heat treatment temperature is a high temperature exceeding 400° C., it is not preferred since the surface of the fiber is thermally deteriorated, and the fiber has poor quality due to coloration.

The stretching ratio in the dry heat treatment has a close relationship to exhibition of the strength of the fiber, and in general, the stretching ratio is preferably set in a range of from 0.7 to 4 times, and more preferably in a range of from 1.5 to 3 times, while the ratio may be arbitrarily selected in consideration of the demanded strength or the like of the product fiber. In the case where the stretching ratio is less than 0.7 time, it is not preferred since the mechanical characteristics of the fiber are deteriorated due to the low process tension, and in the case where the stretching ratio exceeds 4 times, it is not preferred since thread breakage upon stretching is increased, and fuzz and thread breakage in the process occur. The stretching ratio referred herein is expressed by the ratio of the fiber length after the treatment with respect to the fiber length before the treatment as similar to that described for the step (3), and for example, a stretching ratio of 0.7 time means that the fiber is confinedly contracted to 70% of the original length in the heat treatment step, and 1.0 times means a heat treatment with a constant length.

The period of time of the dry heat treatment is generally preferably from 1.0 to 45 seconds. The treating time can be controlled with the running speed of the fiber bundle and the contact length thereof with a heat plate, a heat roller or the like.

ADVANTAGES OF THE INVENTION

The meta-type aramid fiber according to the invention is good in stretching property, does not undergo thread breakage and formation of fuzz in the stretching in the plastic stretching bath, the saturated steam treatment and the dry treatment, and thus can be stretched smoothly to a high total stretching ratio.

In the invention, the solution polymerization, the neutralization reaction, the wet spinning, the plastic stretching, the rinsing and saturated steam treatment and the dry heat treatment mentioned above can be carried out as a continuous coherent process, which is one of the advantages of the invention, and in some cases, the steps may be carried out by dividing into some processes.

The meta-type aramid fiber thus produced may be further subjected to a crimping treatment depending on necessity, being cut into a suitable fiber length, and then fed to the subsequent steps. In some cases, the fiber may be wound as a multi-filament yarn.

The fiber of the invention can be suppressed from suffering coloration or discoloration of the product and can be suppressed from suffering generation of a harmful gas or an organic gas even under processing and use conditions of a particularly high temperature, and thus the fiber is useful particularly as a material, for example, for firefighter clothes, heat resistant working clothes, a filter for a high temperature gas, and the like.

EXAMPLES

The invention will be described in more detail with reference to examples and comparative examples below. However, the examples and comparative examples are only for assisting comprehension of the invention, but the scope of the invention is not limited by the descriptions thereof. The "parts" and "%" in the examples are all based on weight unless otherwise indicated, and the amount ratios are weight ratios unless otherwise indicated.

The properties in the examples and comparative examples were measured in the following manners.

(1) Reduced Viscosity (I.V.)

The aromatic polyamide polymer was isolated from the polymer solution and then dried, and it was measured in concentrated sulfuric acid at a polymer concentration of 0.5 g/100 mL at 30° C.

(2) PN Concentration

The weight percentage of the polymer based on the total part by weight of the polymer solution used for spinning (spinning solution), i.e., the PN concentration, was obtained by the following expression.

$$PN\ concentration\ (\%) = \{polymer/(polymer+solvent+others)\} \times 100$$

(3) Amount of Solvent Remaining in Fiber (Weight of Amide Compound Solvent) N (%)

About 8.0 g of the fiber collected was dried at 105° C. for 120 minutes and then allowed to cool in a desiccator, and the weight of the fiber (M1) was weighed. The fiber was subjected to reflux extraction in methanol for 1.5 hours with a Soxhlet extractor to extract the amide compound solvent contained in the fiber, and the fiber having been extracted and taken out was dried at 150° C. for 60 minutes under vacuum and then allowed to cool in a desiccator, followed by weighing the weight of the fiber (M2). The amount of the solvent remaining in the fiber (weight of the amide compound solvent) N (%) was calculated from M1 and M2 according to the following expression.

$$N\ (\%) = (M1 - M2)/M1 \times 100$$

(4) Dry Heat Contraction Rate at 300° C.

A load of 100 g was hanged on a tow of 3,300 dtex, and marks were put at positions apart from each other by 30 cm. After removing the load, the tow was placed in an atmosphere at 300° C. for 15 minutes, and the distance L (cm) between the marks was measured. The dry heat contraction rate at 300° C. was calculated from the value L according to the following expression.

$$Dry\ heat\ contraction\ rate\ at\ 300°\ C. = (30-L)/30 \times 100$$

(5) Breaking Strength of Fiber

It was measured according to the method disclosed in JIS L1015.

(6) Density of Porous Fibrous Material (Filament) and Product Thread

The density of the porous fibrous material was an apparent density d1 calculated from the fiber diameter and the fineness obtained by measuring according to ASTM D2130 the coagulated fiber collected immediately after the step (1). The density of the product thread about densified fiber after dry heat treatment was a value measured by a sink-float method using tetrachloroethane and cyclohexane as solvents.

(7) Hue of Fiber

The fiber was dried in a drier at 250° C. for 100 hours and measured for change in hue value (L*−b*) by measuring with a color measurement apparatus, "Macbeth Color Eye Model CE-3100", produced by Macbeth Co., Ltd. under conditions of 10° visual field, D65 light source and wavelength of from 360 to 740 nm. A lower hue value (L*−b*) indicates significant yellowing. L* and b* were obtained by the tristimulus value defined in JIS Z8728 (expression method of color by 100 visual field XYZ system).

Example 1

(a) Preparation of Solution Polymerization Spinning Solution 815 parts of N-methyl-2-pyrrolidone (hereinafter abbreviated as "NMP") having been dehydrated with molecular sieve was placed in a reactor equipped with a thermometer, a stirring device and a raw material feeding port, and after dissolving 108 parts of m-phenylenediamine in NMP, the solution was cooled to 0° C. 203 parts of isophthalic chloride having been purified by distillation and pulverized under a nitrogen atmosphere was added to the diamine solution having been cooled under stirring to effect reaction. The reaction temperature was increased to about 50° C., and the solution was stirred continuously at that temperature for 60 minutes, followed by further reacting under heating to 60° C. for 60 minutes. After completing the reaction, 70 parts of calcium hydroxide in a fine powder form was added thereto over 60 minutes for dissolving and neutralizing (primary neutralization). A slurry was prepared by dispersing 4 parts of remaining calcium hydroxide in 83 parts of NMP, and the calcium hydroxide-containing slurry (neutralizing agent) was added to the polymerization solution under stirring (secondary neutralization). The secondary neutralization was carried out at from 40 to 60° C. under stirring for about 60 minutes to dissolve calcium hydroxide completely, and thus a polymer solution as a spinning solution was prepared.

The polymer concentration of the solution (spinning solution) (PN concentration, i.e., the part by weight of the polymer per 100 parts by weight in total of the polymer and NMP) was 14, and the I.V. of the poly-m-phenylene isophthalamide thus formed was 2.37. The calcium chloride concentration and the water concentration of the polymer solution were 46.6 parts for calcium chloride and 15.1 parts for water per 100 parts of the polymer.

(b) Wet Spinning

The spinning solution prepared in the item (a) above was spun by ejecting through a die having a pore diameter of 0.07 mm and a number of pores of 500 into a coagulation bath having a bath temperature of 40° C. A bath having a composition of water/NMP/calcium chloride=48/48/4 (weight ratio) was used as the coagulation bath, and the thread was passed with an immersion length (effective coagulation bath length) of 70 cm at a thread speed of 5 m/min. The density of the porous thread body (fibrous material) taken out from the coagulation bath was 0.71 g/cm$^3$.

(c) Plastic Stretching

The fiber bundle taken out from the coagulation bath was subsequently stretched at a stretching ratio of 3 times in a plastic stretching bath. A bath having a composition of water/NMP/calcium chloride=44/54/2 (weight ratio) was used as the plastic stretching bath, and the temperature thereof was 40° C.

(d) Rinsing and Saturated Steam Treatment

The fiber bundle having been subjected to plastic stretching was sufficiently rinsed with cold water at 30° C. and then further rinsed with warm water at 60° C. The thread having been rinsed with warm water was subsequently subjected to a heat treatment with saturated steam at a stretching ratio of 1.1 times in a container having been filled with saturated steam at an inner pressure maintained at 0.05 MPa. The conditions were controlled in such a manner that the fiber bundle was treated with saturated steam for about 1.0 second.

(e) Dry Heat Treatment

Subsequent to the saturated steam treatment, the fiber bundle was subjected to a dry heat treatment on a heated plate having a surface temperature of 360° C. at a stretching ratio of 1.0 time (constant length), followed by winding.

(f) Characteristics of Fiber

The poly-m-phenylene isophthalamide stretching fiber (product thread) thus obtained was sufficiently densified, and the mechanical characteristics thereof were a fineness of 2.2 dtex, a density of 1.33 g/cm$^3$, a tensile strength of 3.68 cN/dtex and an elongation of 42% as shown in the column of Example 1 in Table 1 shown later, which showed favorable mechanical characteristics with no fluctuation in quality and no formation of abnormal thread. The amount of the solvent remaining in the fiber was as extremely small as 0.71%, and the dry heat contraction rate at 300° C. was 1.2%, which was an extremely small value as compared to about 3% or more for a poly-m-phenylene isophthalamide fiber obtained by a conventional method.

Example 2

A poly-m-phenylene isophthalamide fiber was produced in the same manner as in Example 1 except that dimethylacetamide (hereinafter abbreviated as "DMAc") was used as the polymerization solvent (amide solvent). The results obtained herein are shown in the column of Example 2 in Table 1 shown later.

Examples 3 and 4

A poly-m-phenylene isophthalamide fiber was produced in the same manner as in Example 1 using the same polymerization solution as in Example 1 except that the vapor pressure and the stretching ratio in the saturated steam treatment and the stretching ratio in the dry heat treatment were changed as shown in Table 1. The conditions in the process were good, and the characteristics of the fibers thus obtained were as shown in the columns of Examples 3 and 4 in Table 1 shown later.

Comparative Examples 1 and 2

A poly-m-phenylene isophthalamide fiber was produced in the same manner as in Example 1 using the same polymerization solution as in Example 1 except that the stretching ratio in the dry heat treatment was changed as shown in Table 1, and the saturated steam treatment was omitted. The results obtained herein are shown in the columns of Comparative Examples 1 and 2 in Table 1 shown later.

TABLE 1

|  | Example 1 | Example 2 | Example 3 | Example 4 | Comparative Example 1 | Comparative Example 2 |
|---|---|---|---|---|---|---|
| Amide solvent | NMP | DMAc | NMP | NMP | NMP | NMP |
| Density of coagulated thread body (g/cm$^3$) | 0.71 | 0.70 | 0.71 | 0.71 | 0.71 | 0.71 |
| Pressure of saturated steam (MPa) | 0.05 | 0.05 | 0.40 | 0.05 | no steam | no steam |
| Stretching ratio upon steam treatment (times) | 1.1 | 1.1 | 1.2 | 1.0 | — | — |
| Stretching ratio upon dry heat treatment (times) | 1.0 | 1.0 | 1.0 | 1.0 | 1.0 | 1.2 |
| Fineness of thread (dtex) | 2.2 | 2.2 | 2.2 | 2.3 | 2.3 | 2.2 |
| Breaking strength of thread (cN/dtex) | 3.68 | 3.72 | 3.91 | 3.52 | 3.49 | 3.73 |

TABLE 1-continued

|  | Example 1 | Example 2 | Example 3 | Example 4 | Comparative Example 1 | Comparative Example 2 |
|---|---|---|---|---|---|---|
| Breaking elongation of thread (%) | 42 | 46 | 38 | 57 | 55 | 42 |
| Density of thread (g/cm³) | 1.33 | 1.33 | 1.33 | 1.32 | 1.33 | 1.33 |
| Amount of remaining solvent (%) | 0.71 | 0.52 | 0.38 | 0.93 | 2.36 | 2.28 |
| Dry heat contraction ratio at 300° C. (%) | 1.2 | 1.3 | 0.8 | 1.6 | 2.8 | 3.7 |
| Hue (L*-b*) before heat treatment | 79.8 | 80.6 | 80.1 | 79.0 | 74.1 | 73.9 |
| Hue (L*-b*) after heat treatment at 250° C. for 1 hour | 76.2 | 77.1 | 78.5 | 75.9 | 71.5 | 70.2 |

INDUSTRIAL APPLICABILITY

According to the invention, such a meta-type wholly aromatic polyamide fiber (particularly a poly-m-phenylene isophthalamide fiber) is provided that is good in mechanical strength, heat resistance and the like, and has an extremely small amount of a solvent remaining in the fiber, which can suppress coloration or discoloration of the product even under processing and using conditions at a high temperature, and is capable of suppressing generation of a harmful gas or an organic gas, whereby the meta-type wholly aromatic polyamide fiber according to the invention has significant usefulness particularly in the field where the fiber is processed or used at a high temperature.

The invention claimed is:

1. A meta-type wholly aromatic polyamide fiber excellent in high temperature processability, characterized in that an amount of a solvent remaining in the fiber is 0.8% by weight or less, a dry heat contraction rate at 300° C. is 3% or less, and a breaking strength of the fiber is 3.5 cN/dtex or more, wherein a monofilament of the fiber has a fineness of from 0.5 to 10.0 dtex, and wherein the fiber is produced by a process comprising wet spinning.

2. The meta-type wholly aromatic polyamide fiber excellent in high temperature processability as claimed in claim 1, wherein the solvent remaining in the fiber is an amide solvent.

3. The meta-type wholly aromatic polyamide fiber excellent in high temperature processability as claimed in claim 2, wherein the amide solvent remaining in the fiber is at least one of N-methyl-2-pyrrolidone, dimethylacetamide and dimethylformamide.

4. A method for producing a meta-type wholly aromatic polyamide fiber excellent in high temperature processability, characterized in that an amount of a solvent remaining in the fiber is 0.8% by weight or less, a dry heat contraction rate at 300° C. is 3% or less, and a breaking strength of the fiber is 3.5 cN/dtex or more,
by wet spinning a polymer solution containing a meta-type wholly aromatic polyamide comprising a m-phenylenediamine isophthalamide skeleton as a major component, and an amide solvent containing a salt, characterized in that (1) the polymer solution is ejected into a coagulation bath containing an amide solvent and water and containing a salt to coagulate as a porous fibrous material, (2) which is subsequently stretched in a plastic stretching bath containing an aqueous solution of an amide solvent, (3) is rinsed with water and then subjected to a heat treatment in saturated steam, and (4) is then subjected to a dry heat treatment.

5. The method for producing a meta-type wholly aromatic polyamide fiber as claimed in claim 4, wherein in the step (1), the coagulation bath has a composition in terms of weight ratio of the amide solvent of from 40 to 60% by weight and a concentration of the salt of from 0.3 to 10% by weight, and a temperature of the coagulation bath is from 20 to 70° C.

6. The method for producing a meta-type wholly aromatic polyamide fiber as claimed in claim 4, wherein in the step (2), the plastic stretching bath has a composition in terms of weight ratio of the amide solvent of from 20 to 70% by weight, and the fibrous material is stretched at a ratio of from 1.5 to 10 times in the plastic stretching bath at a temperature of from 20 to 70° C.

7. The method for producing a meta-type wholly aromatic polyamide fiber as claimed in claim 4, wherein in the step (3), the fibrous material is subjected to the heat treatment at a stretching ratio of from 0.7 to 5.0 times in saturated steam of from 0.02 to 0.50 MPa.

8. The method for producing a meta-type wholly aromatic polyamide fiber as claimed in claim 4, wherein in the step (4), the fibrous material is subjected to the dry heat treatment at a stretching ratio of from 0.7 to 4.0 times at a temperature of from 250 to 400° C.

9. The method for producing a meta-type wholly aromatic polyamide fiber as claimed in claim 4, wherein as the polymer solution subjected to wet spinning, a meta-type wholly aromatic polyamide solution is used that contains calcium chloride and water formed through neutralization of hydrogen chloride by-produced after reacting an aromatic diamine and an aromatic dicarboxylic chloride in the presence of an amide solvent.

10. The method for producing a meta-type wholly aromatic polyamide fiber as claimed in claim 4, wherein as the amide solvents contained in the polymer solution, the coagulation bath and the plastic stretching bath, one, or two or more selected from the group consisting of N-methyl-2-pyrrolidone, dimethyacetamide and dimethylformamide are used.

11. The method for producing a meta-type wholly aromatic polyamide fiber as claimed in claim 4, wherein in a method for producing a meta-type wholly aromatic polyamide fiber by wet spinning a polymer solution containing a meta-type wholly aromatic polyamide comprising a m-phenylenediamine isophthalamide skeleton as a major component, and an amide solvent including a salt, (1) the polymer solution is coagulated in a coagulation bath containing an amide solvent and water and containing a salt, where in the coagulation bath, a composition in terms of weight ratio of the amide solvent is from 40 to 60% by weight and a concentration of the salt is from 0.3 to 10% by weight, and a temperature of the coagulation bath is from 20 to 70° C., to form a porous fibrous material, (2) which is subsequently stretched at a ratio of from 1.5 to 10 times in a plastic stretching bath containing an aqueous solution of an amide solvent and having a composition in terms of weight ratio of the amide solvent of from 20 to 70% by weight and at a temperature of from 20 to 70° C., (3) is rinsed with water and then subjected to a heat treatment in saturated steam of from 0.02 to 0.50 MPa at a stretching ratio of from 0.7 to 5.0 times, and (4) is then subjected to a dry heat treatment at a stretching ratio of from 0.7 to 4.0 times at a temperature of from 250 to 400° C.

12. The method for producing a meta-type wholly aromatic polyamide fiber as claimed in claim 5, wherein in the step (2), the plastic stretching bath has a composition in terms of weight ratio of the amide solvent of from 20 to 70% by weight, and the fibrous material is stretched at a ratio of from 1.5 to 10 times in the plastic stretching bath at a temperature of from 20 to 70° C.

13. The method for producing a meta-type wholly aromatic polyamide fiber as claimed in 5, wherein in the step (3), the fibrous material is subjected to the heat treatment at a stretching ratio of from 0.7 to 5.0 times in saturated steam of from 0.02 to 0.50 MPa.

14. The method for producing a meta-type wholly aromatic polyamide fiber as claimed in 6, wherein in the step (3), the fibrous material is subjected to the heat treatment at a stretching ratio of from 0.7 to 5.0 times in saturated steam of from 0.02 to 0.50 MPa.

15. The method for producing a meta-type wholly aromatic polyamide fiber as claimed in 5, wherein in the step (4), the fibrous material is subjected to the dry heat treatment at a stretching ratio of from 0.7 to 4.0 times at a temperature of from 250 to 400° C.

16. The method for producing a meta-type wholly aromatic polyamide fiber as claimed in 6, wherein in the step (4), the fibrous material is subjected to the dry heat treatment at a stretching ratio of from 0.7 to 4.0 times at a temperature of from 250 to 400° C.

17. The method for producing a meta-type wholly aromatic polyamide fiber as claimed in 7, wherein in the step (4), the fibrous material is subjected to the dry heat treatment at a stretching ratio of from 0.7 to 4.0 times at a temperature of from 250 to 400° C.

18. The method for producing a meta-type wholly aromatic polyamide fiber as claimed in 5, wherein as the polymer solution subjected to wet spinning, a meta-type wholly aromatic polyamide solution is used that contains calcium chloride and water formed through neutralization of hydrogen chloride by-produced after reacting an aromatic diamine and an aromatic dicarboxylic chloride in the presence of an amide solvent.

19. The method for producing a meta-type wholly aromatic polyamide fiber as claimed in 6, wherein as the polymer solution subjected to wet spinning, a meta-type wholly aromatic polyamide solution is used that contains calcium chloride and water formed through neutralization of hydrogen chloride by-produced after reacting an aromatic diamine and an aromatic dicarboxylic chloride in the presence of an amide solvent.

20. The method for producing a meta-type wholly aromatic polyamide fiber as claimed in 7, wherein as the polymer solution subjected to wet spinning, a meta-type wholly aromatic polyamide solution is used that contains calcium chloride and water formed through neutralization of hydrogen chloride by-produced after reacting an aromatic diamine and an aromatic dicarboxylic chloride in the presence of an amide solvent.

21. The meta-type wholly aromatic polyamide fiber excellent in high temperature processability as claimed in claim 1, wherein the fiber has a hue ($L^*$–$b^*$) before heat treatment of 79.0-80.6 obtained in accordance with JIS Z8728.

* * * * *